(12) United States Patent
Asokan

(10) Patent No.: US 11,132,374 B2
(45) Date of Patent: Sep. 28, 2021

(54) PROPERTY PAINTER

(71) Applicant: Oracle International Corporation, Redwood Shores, CA (US)

(72) Inventor: Saju Asokan, Trivandrum (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 208 days.

(21) Appl. No.: 16/528,378

(22) Filed: Jul. 31, 2019

(65) Prior Publication Data

US 2021/0034611 A1   Feb. 4, 2021

(51) Int. Cl.
*G06F 16/30* (2019.01)
*G06F 16/248* (2019.01)
*G06F 16/2457* (2019.01)
*G06F 8/77* (2018.01)
*G06F 16/2455* (2019.01)

(52) U.S. Cl.
CPC .............. *G06F 16/248* (2019.01); *G06F 8/77* (2013.01); *G06F 16/2455* (2019.01); *G06F 16/24578* (2019.01)

(58) Field of Classification Search
CPC ............... G06F 16/248; G06F 16/2455; G06F 16/24578; G06F 16/2291; G06F 16/9538
USPC ........ 707/609, 687, 705, 769, 790, 813, 821
See application file for complete search history.

(56) References Cited

U.S. PATENT DOCUMENTS 7,188,316 B2  3/2007  Gusmorino et al.
7,802,186 B2  9/2010  Burke et al.
2003/0001892 A1  1/2003  Hartel et al.
2003/0009323 A1*  1/2003  Adeli ............... G06F 9/454 704/8
2005/0086251 A1  4/2005  Hatscher et al.
2005/0235258 A1  10/2005  Wason
2006/0153097 A1  7/2006  Schultz
2007/0061714 A1  3/2007  Stuple et al.
2017/0052766 A1*  2/2017  Garipov ............. G06F 16/2291
2017/0192944 A1*  7/2017  Davis ................. G06F 3/0484

(Continued)

OTHER PUBLICATIONS

Applying the Same Attribute Values to Multiple Features in a Layer, ArcMap 10.3, Available online at: http://desktop.arcgis.com/en/arcmap/10.3/manage-data/editing-attributes/applying-the-same-attribute-values-to-multiple-features-in-a-layer.htm, Accessed from Internet on Feb. 20, 2019, 3 pages.

(Continued)

*Primary Examiner* — Sana A Al-Hashemi
(74) *Attorney, Agent, or Firm* — Kilpatrick Townsend & Stockton LLP

(57) ABSTRACT

Techniques for assigning one or more values to properties or form fields. One technique includes receiving a query for a property associated with an attribute of an element of software, executing a search within a storage device for the property that satisfies the query, displaying the property and attributes that support the property, and receiving a first type of input regarding the property. The first type of input includes a value for the property. The technique further includes receiving a second type of input that includes selection of at least one attribute from the attributes identified to support the property, and assigning the value for the property to the at least one attribute.

20 Claims, 9 Drawing Sheets

(56) References Cited

U.S. PATENT DOCUMENTS

2019/0171438 A1* 6/2019 Franchitti .......... G06F 16/9538

OTHER PUBLICATIONS

Assign, Outsystems, Available online at: https://success.outsystems.com/Documentation/11/Reference/OutSystems_Language/Logic/Implementing_Logic/Mobile_Logic_Tools/Assign, 2019, 2 pages.

Attribute Painter, QGIS Python Plugins Repository, Available online at: https://plugins.qgis.org/plugins/attributePainter/, 3 pages.

CorelCAD™ 2013, Corel, Review's Guide, Available online at: http://www.arp.com/medias/14335783.pdf, 2013, 20 pages.

Editing Object Properties, SAP Documentation, Available online at: https://help.sap.com/doc/saphelp_nw73ehp1/7.31.19/en-US/48/f9456d8be56b41e10000000a42189c/frameset.htm, Accessed from Internet on Feb. 20, 2019, 1 page.

Property Painter, CA Dopia, Available online at: http://www.cadopla.com/property_painter/, Accessed from Internet on Feb. 20, 2019, 2 pages.

Using the Grab and Paint Properties Tools, AMX MIO-R4 Operation/reference Manual, Touch panel design program (v2.10 or higher), Available online at: https://www.manualslib.com/manual/209315/Amx-Mio-R4.html?page=171#manual, 2008, 274 pages.

* cited by examiner

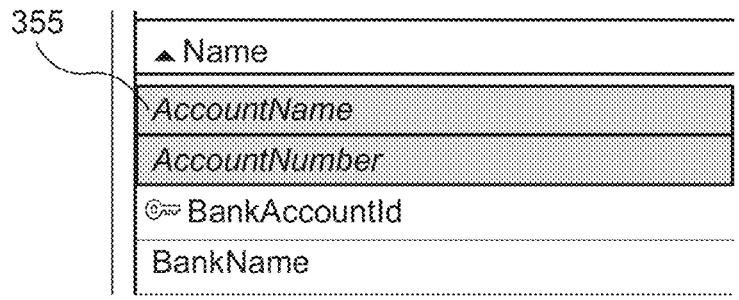

FIG. 3F

```
          <ViewAttribute
355           Name="AccountName"
              IsNotNull="true"
              IsQueriable="false"
              PrecisionRule="true"
              EntityAttrName="AccountName"
              EntityUsage="AbcBankAccounts"
              AliasName="ACCOUNT_NAME"/>
          <ViewAttribute
355           Name="AccountNumber"
              IsNotNull="true"
              IsQueriable="false"
              PrecisionRule="true"
              EntityAttrName="AccountNumber"
              EntityUsage="AbcBankAccounts"
              AliasName="ACCOUNT_NUMBER"/>
          <ViewAttribute
              Name="BankAccountId"
              IsNotNull="true"
              PrecisionRule="true"
              EntityAttrName="BankAccountId"
              EntityUsage="AbcBankAccounts"
              AliasName="BANK_ACCOUNT_ID"/>
```

FIG. 3G

PROPERTY PAINTER

FIELD OF THE INVENTION

The present disclosure relates generally to continuous delivery software development, and more particularly, to techniques to assign one or more values to properties or form fields.

BACKGROUND

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts. Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Software designers (e.g., code editors, web designers, application developers, etc.) typically use interfaces with an ADF to assign one or more values to properties or form fields in the application design process. Design elements such as entities and objects have a number of attributes that support various properties. In some instances, the values for these properties may be input or assigned individually using an input device such as a keyboard. In other instances, the values are input via a user interface and/or wizard that require a number of sequential steps including selecting and setting values to the properties. These processes are time consuming, repetitive and, therefore, inefficient. For example, on a form with multiple interface elements, a designer typically has to change a value (e.g., an identifier) of at least one property or form field for each one of the elements. A moderately complex form may contain over a hundred elements, which can be a significant task for the designer to complete.

Attempts have been made to improve upon the editing of properties. In some instances, designers have set a default property value on a component directly on the design surface rather than in a separate property browser. For example, a design feature may be provided that can allows a user (e.g., developer) to easily perform multi-pass configuration operations on interface elements. This can be achieved by using an editing mode or view within the IDE. In other words, the user may be presented with a mechanism of viewing and editing all properties without having to move off of the design surface. For example, editing can be performed in-place eliminating the need to enter a separate property grid. These attempts, however, are typically limited to a text property of the element and often require the properties of each element to be individually configured. As well, support and/or configuration of the properties is specified by the element itself. In other words, the element specifies as to whether or not a property is supported by the element. This element dictated method leads to inconsistent user experience and implementation. Therefore, methods and systems for consistently and efficiently assigning property values is desired.

BRIEF SUMMARY

Techniques are provided (e.g., a method, a system, non-transitory computer-readable medium storing code or instructions executable by one or more processors) for assigning one or more values to properties or form fields.

In various embodiments, a method is provided that comprises: receiving, by a data processing system, a query for a property associated with an attribute of an element of software; executing, by the data processing system, a search within a storage device of the data processing system for the property that satisfies the query; displaying, by the data processing system, the property and attributes that support the property; receiving, by the data processing system, a first type of input regarding the property, where the first type of input includes a value for the property; receiving, by the data processing system, a second type of input that includes selection of at least one attribute from the attributes that support the property; and assigning, by the data processing system, the value for the property to the at least one attribute.

In some embodiments, the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

In some embodiments, the attributes are displayed with the identifier to identify whether the attributes support all of the properties.

In some embodiments, the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

In some embodiments, the value is assigned to only the selected multiple attributes across multiple elements of the software.

In some embodiments, the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

In some embodiments, the value is assigned to all of the attributes identified to support the property across multiple elements of the software.

In various embodiments, a non-transitory computer-readable memory is provided for storing a plurality of instructions executable by one or more processors, the plurality of instructions comprising instructions that when executed by the one or more processors cause the one or more processors to perform processing comprising: receiving a query for a property associated with an attribute of an element of software; executing a search within a storage device for the property that satisfies the query; displaying the property and attributes that support the property; receiving a first type of input regarding the property, where the first type of input includes a value for the property; receiving a second type of input that includes selection of at least one attribute from the attributes that support the property; and assigning the value for the property to the at least one attribute.

In some embodiments, the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

In some embodiments, the attributes are displayed with the identifier to identify whether the attributes support all of the properties.

In some embodiments, the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

In some embodiments, the value is assigned to only the selected multiple attributes across multiple elements of the software.

In some embodiments, the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

In some embodiments, the value is assigned to all of the attributes identified to support the property across multiple elements of the software.

In various embodiments, a system is provided that comprises: one or more processors; and a memory coupled to the one or more processors, the memory storing a plurality of instructions executable by the one or more processors, the plurality of instructions comprising instructions that when executed by the one or more processors cause the one or more processors to perform processing comprising: receiving a query for a property associated with an attribute of an element of software; executing a search within a storage device for the property that satisfies the query; displaying the property and attributes that support the property; receiving a first type of input regarding the property, where the first type of input includes a value for the property; receiving a second type of input that includes selection of at least one attribute from the attributes that support the property; and assigning the value for the property to the at least one attribute.

In some embodiments, the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

In some embodiments, the attributes are displayed with the identifier to identify whether the attributes support all of the properties.

In some embodiments, the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

In some embodiments, the value is assigned to only the selected multiple attributes across multiple elements of the software.

In some embodiments, the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

BRIEF DESCRIPTION OF THE DRAWINGS

FIGS. 3A-3G depicts an exemplary use case for the property painter tool in accordance with various embodiments.

DETAILED DESCRIPTION

Figure 1:
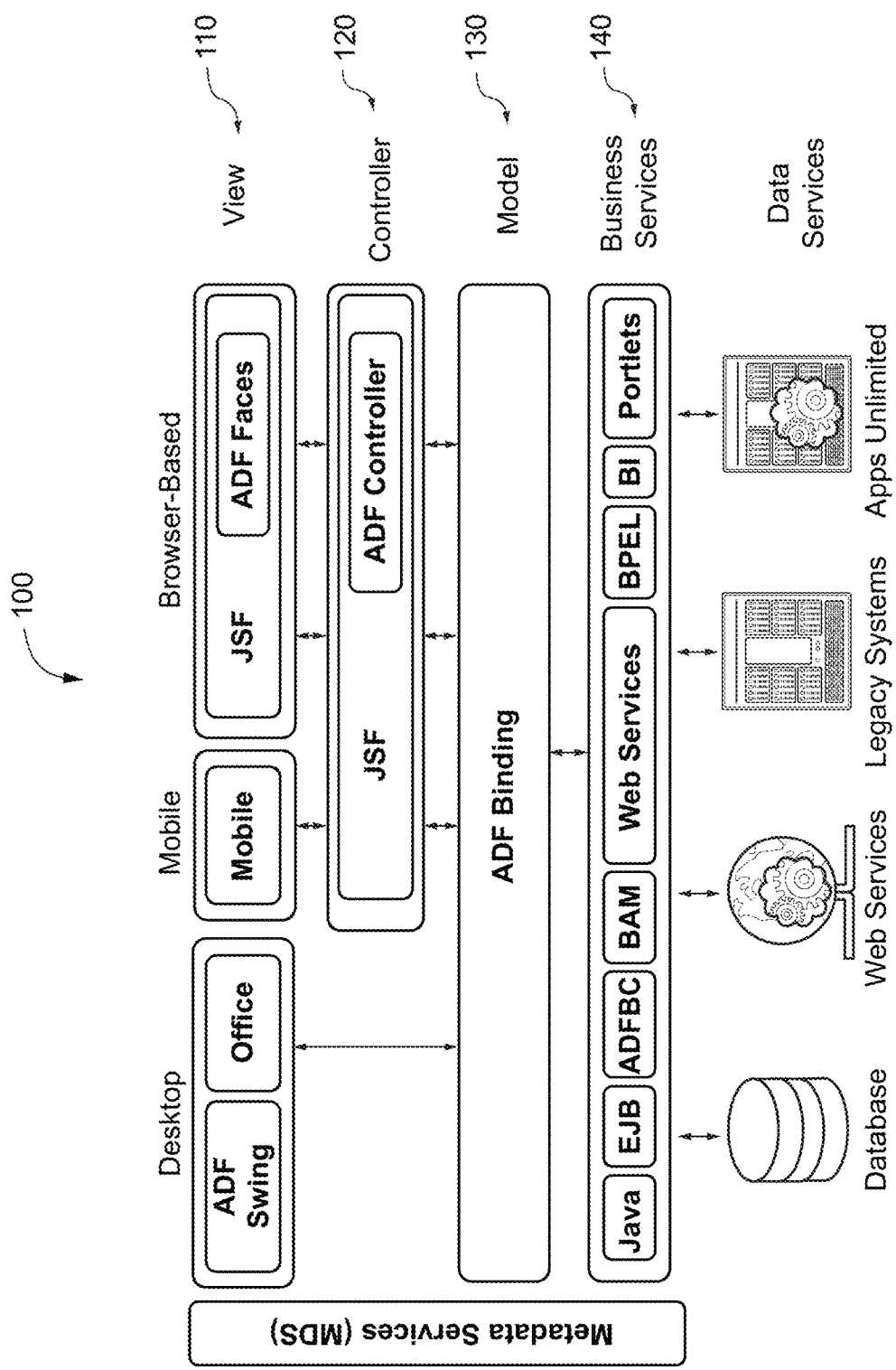
FIG. 1 depicts a block diagram illustrating an application development framework (ADF) in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In various embodiments, a property painter tool is provided that can be used to assign one or more values to properties or form fields. The property painter tool may be implemented in a variety of applications including code editors, web browsers, application design tools, etc. In some embodiments, the property painter tool is implemented as part of a toolbar or menu, and when invoked by a user, helps the user assign property values to properties or form fields, and apply the values to any attributes or elements that support the properties or form fields by clicking and painting the values. Properties and form fields may be used interchangeable (i.e., techniques applicable for a property would be equally applicable to a form field), and thus alternative techniques discussing properties or form fields are not repeated hereafter for brevity. As used herein, an "element" refers to a sequence of abstract program statements that describe computations to be performed by a machine. An example of an element in object-oriented programming would include entities and objects. As used herein, an "attribute" refers to a specification that defines one or more properties of the element. As used herein, a "property" or "properties" are variables, settings, configurations, or rules attributable to an element. As used herein, a "form field" or "form fields" are input features capable of receiving variables, settings, configurations, or rules attributable to an element (e.g., the form field may take on a variable that defines how each element of a Web page appears and behaves).

Limitations associated with conventional property editing tools include, but are not limited to, the user or developer being bound by a predefined set or list of properties available for transfer or copy between entities. For example, an entity can have a number of properties and sometimes a user or designer wants one entity to have the same properties as another entity. A conventional property editing tool may provide a user with a predefined list of properties (some basic and some specific to certain type of entities) available to be copied between entities. The user may select one or more of the properties, a source entity, and a target or destination entity. Upon triggering the tool, the values for the properties from the source entity will be transferred to the target entity. Nonetheless, because such tools are developed for users or developers that have a wide breadth of experience with property editing (e.g., the user or developer may be unaware of whether an entity or attribute supports a given a property), the properties that are available to be edited or coped are limited by a predefined set or list of properties. This editing technique leads to a very rudimentary user experience and implementation. However, as developers add more features to applications that call for more custom properties, it can get harder to support and edit properties, keeping track of which entities are in which application and the properties applicable to the entities or applications can make it harder to manually edit properties and less useful to use predefined sets or lists of properties.

To overcome the challenges of designing software and assigning one or more values to properties or form fields in an efficient manner, various embodiments are directed to a property painter tool that can be used to assign property values to properties or form fields, and apply the values to any attributes or elements that support the properties or form fields. In various embodiments, a technique implemented by the painter tool include receiving a query for a property associated with an attribute of an element of software, executing a search within a storage device for the property that satisfies the query, displaying the property and attributes that support the property, and receiving a first type of input regarding the property. The first type of input includes a value for the property. The technique further includes receiving a second type of input that includes selection of at least one attribute from the attributes identified to support the property, and assigning the value for the property to the at least one attribute. In some embodiments, the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode. In other embodiments, the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

Application Development Framework with Integrated Development Environment Tooling Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of Application Development Frameworks (ADFs), the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications, the ADF provides the infrastructure code to implement agile SOA based applications thereby removing the effort involved in an organization "rolling their own."

The ADF further provides a visual and declarative approach to Java EE development through a development tool, e.g., an integrated development environment (IDE) such as Oracle JDeveloper or Eclipse. In some embodiments, the IDE is implemented in a Model-View-Controller (MVC) design pattern and offers an integrated solution that covers all the layers of this architecture with solution to such areas as Object/Relational mapping, data persistence, reusable controller layer, rich Web user interface framework, data binding to user interface (UI), security and customization. Extending beyond the core Web based MVC approach, ADF also integrates with the SOA and WebCenter Portal frameworks simplifying the creation of complete composite applications. For example, the ADF makes it easy to develop agile applications that expose data as services by coupling a service interface to the built-in business services in ADF. This separation of business service implementation details is performed in the ADF via metadata. Use of this metadata-driven architecture enables application developers to focus on the business logic and user experience, rather than the details of how services are accessed.

The ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating an ADF 100 in various embodiments. FIG. 1 is a simplified illustration of a system that may incorporate various embodiments or implementations of techniques presented within this disclosure. FIG. 1 is merely be illustrative of one or more embodiments or implementations of a system disclosed herein and should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. In various embodiments, ADF 100 is based on a MVC design pattern. An MVC application is separated into: 1) a model layer that handles interaction with data-sources and runs the business logic, 2) a view layer that handles the application user interface, and 3) a controller that manages the application flow and acts as the interface between the model and the view layers. Separating applications into these three layers simplifies maintenance and reuse of components across applications. The independence of each layer from the others results in a loosely coupled SOA.

In some embodiments, modules forming an enterprise application are shown as being within ADF 100 to represent that the modules are developed using ADF 100 and then executed within the context of ADF 100. For conciseness, the various internal details of ADF are not shown assuming that the application is developed using JAVA programming language and Oracle ADF available as part of JDeveloper 10.1.3, a development tool available from Oracle Corporation. However, the features of the present disclosure described herein may be implemented using any desired combination of programming language and software development tool as will be apparent to one skilled in the relevant arts by reading the disclosure provided herein.

In various embodiments, the ADF 100 enables an application to be developed in the form of multiple layers, each layer containing code modules/files implementing desired logic according to pre-defined specification. For example, the application may be developed as four layers: (i) view layer 110 containing code modules/files that provide the user interface of the application; (ii) controller layer 120 containing code modules that control the flow of the application; (iii) model layer 130 containing data/code modules that provide an abstraction layer for the underlying data, and (iv) business services layer 140 containing code modules that provide access to data from various sources and handles business logic.

The ADF lets developers choose the technology they prefer to use when implementing each of the layers. FIG. 1 shows various options available for developers when building ADF applications. The glue that integrates the various components of Java EE applications and makes development so flexible is the ADF model layer 130. EJB, Web Services, JavaBeans, JPA/EclipseLink/TopLink objects, and many others can all be used as Business Services for the ADF Model. View layers can include Web based interfaces implemented with JSF, Desktop Swing applications and MS Office front ends, as well as interfaces for mobile devices. It may be appreciated that the development of the application using such a layered approach often simplifies maintenance and reuse of components/code modules across various applications. Further, the independence of each layer from the other layers results in a loosely coupled SOA, which may be desirable when deploying the developed business/enterprise application on multiple/different systems.

In some embodiments, the view layer 110 represents the user interface of the application being developed. The view layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. The ADF may support multi-channel access to business services allowing reuse of business services and access from a Web client, a client-server swing desktop-based application, Microsoft Excel spreadsheets, mobile devices such as a smart-phone, or the like. The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted herein, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) for the user during execution of the enterprise application.

In some embodiments, the controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc. In certain aspects, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page. The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

In some embodiments, the model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers. In certain aspects, model layer 130 comprises two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of business service layer 140 implementation to the view layer 110 and controller layer 120.

The ADF 100 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories. By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, the business services layer 140 manages interaction with a data persistence layer. The business services layer 140 provides such services as data persistence, object/relational mapping, transaction management, and business logic execution. The business services layer 140 in the ADF 100 can be implemented in any of the following options: As simple Java classes, EJB, Web services, JPA objects, and Oracle ADF Business Components. In addition, data can be consumed directly from files (XML or CSV) as well as REST. Thus, each business service manages an interaction with a corresponding data persistence layer, and also provides such services as object/relational mapping, transaction management, business logic execution, etc. In some embodiments, the business services layer 140 may be implemented using one or more of simple Java classes, Enterprise Java Beans, web services, etc.

Business components represent a business service implemented using, for example, ADF business components, to provide interaction with databases, web services, legacy systems, application servers, and the like. In some embodiments, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions. In one example, an entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 2:
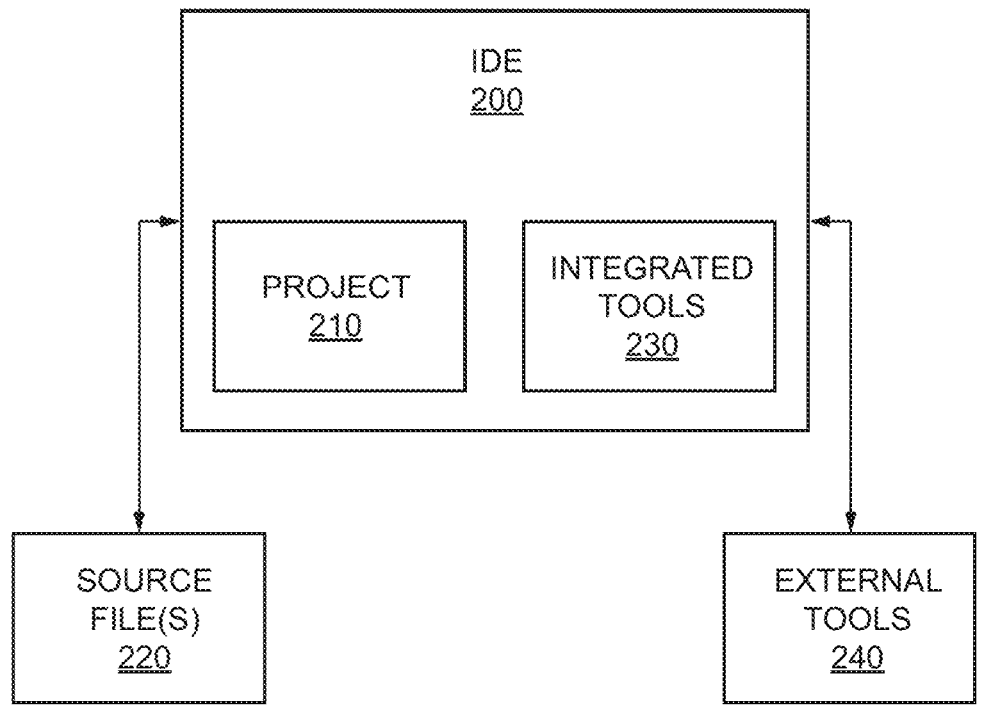
FIG. 2 depicts a block diagram illustrating a desktop integration environment in accordance with various embodiments.

FIG. 2 is a block diagram of an IDE 200 having tooling for application development in accordance with various embodiments. In general, the IDE 200 is a software application that provides comprehensive facilities to computer programmers for software development. Some examples of the IDE 200 are Oracle JDeveloper, Net Beans, Eclipse, SharpDevelop, and Lazarus. The IDE 200 may be comprised of a source code editor, build automation tools, and a debugger. The IDE 200 may offer intelligent code completion or other features. IDE 200 may contain a compiler, interpreter, or both. The IDE 200 may include or interface with a version control system. In some embodiments, the IDE 200 is used to create a project 210 (e.g., a source code file, an element of an application, an application, a graphical user interface (GUI), or the like). Project 210 may be used as a container for accessing source file(s) 220. The source files 220 may include source code, element specifications, user interface specifications, and other information required for a particular development project. The project 210 may aggregate the code, element specifications, user interface specifications, and other information required for a particular development project. In some embodiments, the element specifications include attributes associated with each element and metadata for each of the elements or attributes that define properties that are applicable to the element or attribute.

As shown in FIG. 2, the IDE 200 includes integrated tools 230 and interacts with external tools 240. The internal tools 230 and the external tools 240 may be utilized with the IDE 200 to simplify the construction of a project such as a source code file, an element of an application, an application, a GUI, or the like. In certain embodiments, the internal tools 230 or the external tools 240 include a property painter tool, as described in further detail herein, which is used to configure properties of elements and attributes, and paint property values within or across various elements being developed by the IDE 200. The internal tools 230 and the external tools 240 may further include a class browser, an object browser, and a class hierarchy diagram, for use in object-oriented software development.

Property Painter Techniques

In various embodiments, a property painter tool is provided that can be used to assign one or more values to properties or form fields. The property painter tool may be implemented in a variety of applications including code editors, web browsers, application design tools, etc. In some embodiments, the property painter tool is implemented as part of a toolbar or menu, and when invoked by a user, helps the user assign property values to properties or form fields, and apply the values to any attributes or elements that support the properties or form fields.

Figure 3A:
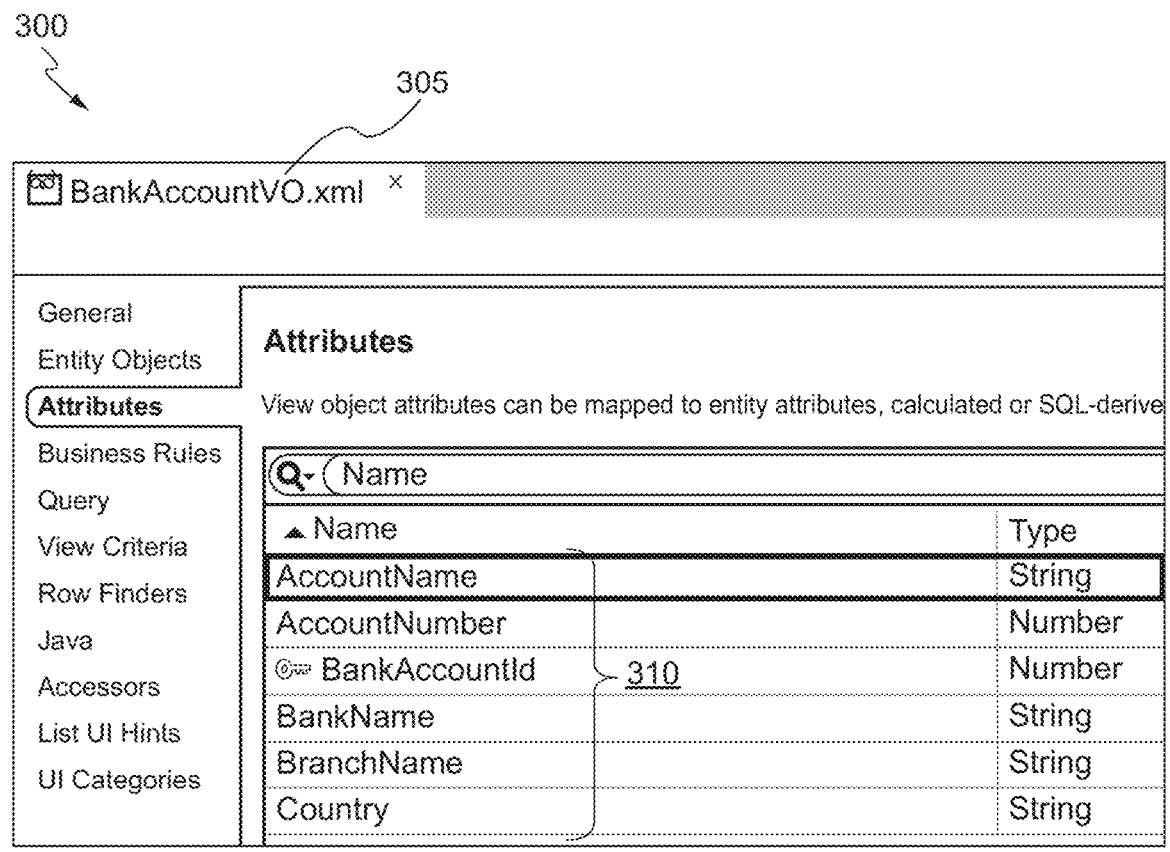

An exemplary use case for the property painter tool would be within a code editor such as the IDE described with respect to FIGS. 1 and 2 where there are many elements (e.g., entities and objects) that have numerous attributes that support various properties. For example, FIG. 3A shows an IDE display 300 illustrating an entity 305 called Bank Account of an application developed in the IDE of FIGS. 1 and 2. The entity 305 comprises a number of attributes 310 including, for example, AccountName, AccountNumber, BankAccountId, BankName, BranchName, and Country. Each of the attributes 310 may support one or more properties (not shown). For example, the AccountNumber may support the following properties: Name, IsNotNull, and PrecisionRule. Users of the IDE such as developers frequently come across scenarios in software development where one or more properties need to be edited or updated for multiple attributes and/or elements, which in a conventional IDE has to be performed manually or in an inefficient manner.

Figure 3B:
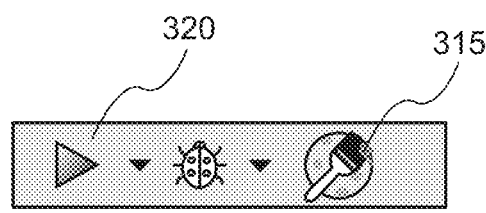
Figure 3C:
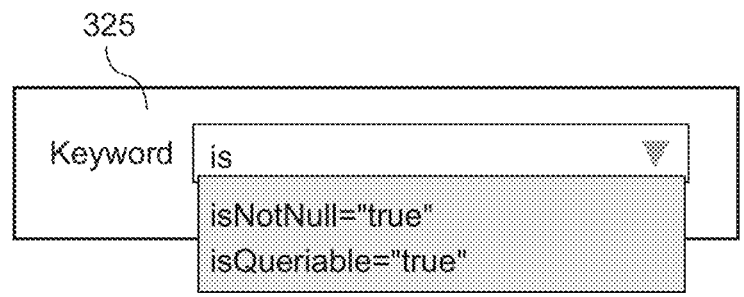
Figure 3D:
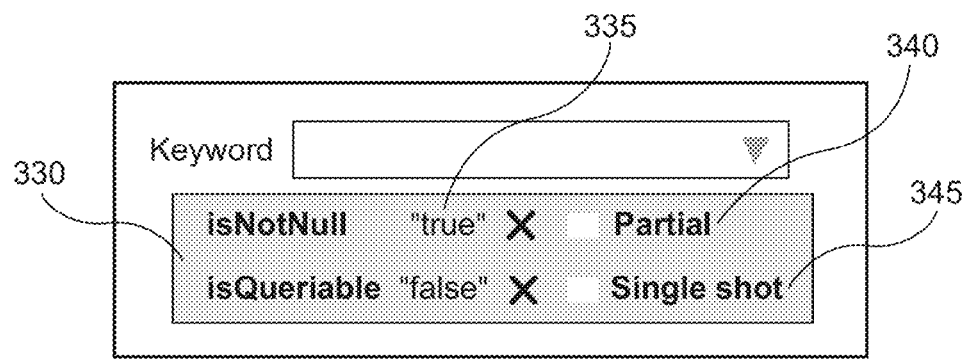

However, in accordance with various embodiments described herein, the user does not have to edit or update each property one by one or in an inefficient manner, and instead the property painter tool may be used to assign one or more values to properties or form fields across a variety of attributes and/or elements (e.g., entities and objects). For example, a user may select the property painter tool 315 from a toolbar 320, as shown in FIG. 3B. After selection, an input tool 325 is displayed to the user for input of properties into a virtual box 330 (e.g., a list of properties that the user requests to edit), as shown in FIGS. 3C and 3D. In some embodiments, the input tool 325 is a search bar configured to receive queries (e.g., Boolean based queries) for one or more properties. In other embodiments, the input tool 325 is a look up table or the like for identifying one or more properties. As shown, the user may input a portion of a property, a property, or multiple properties into the input tool 325, run a query on the input, and select any property that results from the query for input into the virtual box 330. The user can then edit the value 335 of the property in the virtual box 330 or remove the property from the virtual box.

At this stage, the user may also choose to enable various modes of painting, as shown in FIG. 3D. In a partial painting mode 340 with partial support, (e.g., partial painting may be enabled with selection and partial support may be enabled with a Boolean search operation such as "OR" between the queried properties), attributes that support at least one or more of the queued properties are identified. Each of the attributes that support at least one or more of the queried properties may be individually selected for painting of one or more corresponding property values. The selection can be made at the entity level or attribute level and the painting operation may be implemented within or across entities and attributes. Thus, during a property value paint operation in partial painting mode 340 with partial support, only the queried properties that are supported by the attribute get set with the input values, and the user can paint property values on any attribute that supports at least one of the queried properties. In a partial painting mode 340 with full support, (e.g., partial painting may be enabled with selection and full support may be enabled with a Boolean search operation such as "AND" between the queried properties) only the attributes that support all of the queued properties are identified. Each of the attributes that support all of the queried properties may be individually selected for painting of one or more corresponding property values. The selection can be made at the entity level or attribute level and the painting operation may be implemented within or across entities and attributes. Thus, during a property value paint operation in partial painting mode 340 with full support, all the queried properties that are supported by the attribute get set with the input values, and the user can only paint property values on the attributes supporting all of the queried properties. In some embodiments, there can be distinct colored indications provided for each property queued and the supported properties can be displayed beside attributes that support the specific property for easy identification.

In a single shot mode 345 with partial support, (e.g., single shot may be enabled with selection and partial support may be enabled with a Boolean search operation such as "OR" between the queried properties), attributes that support at least one or more of the queued properties are identified. All of the attributes that support at least one or more of the queried properties are may be selected with a single selection (grouped selection method) for painting of one or more corresponding property values. The selection may be made at the entity level and the painting operation may be implemented within or across entities and attributes. Thus, during a property value paint operation in single shot mode 345 with partial support, only the queried properties that are supported by the attribute get set with the input values, and the user can paint property values on any attribute that supports at least one of the queried properties. In a single shot mode 345 with full support, (e.g., single shot may be enabled with selection and full support may be enabled with a Boolean search operation such as "AND" between the queried properties) only the attributes that support all of the queued properties are identified. All of the attributes that support all of the queried properties may be selected with a single selection (grouped selection method) for painting of one or more corresponding property values. The selection may be made at the entity level and the painting operation may be implemented within or across entities and attributes. Thus, during a property value paint operation in single shot mode 345 with full support, all the queried properties that are supported by the attribute get set with the input values, and the user can only paint property values on the attributes supporting all of the queried properties. In some embodiments, there can be distinct colored indications provided for each property queued and the supported properties can be displayed beside attributes that support the specific property for easy identification.

Figure 3E:
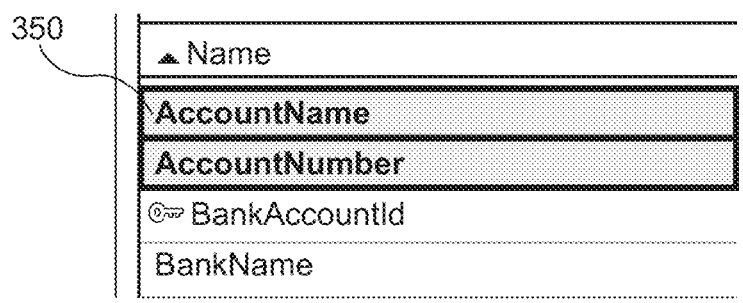

FIG. 3E shows a user may click on any supported attribute on which they want property values to be painted. In this example, the attributes 350—AccountName and AccountNumber have been identified with an identifier such as red or bold text by the tool as supporting at least one of the queried properties if using partial support and all of the queried properties if using full support. When in partial painting mode, if the user selects the attribute—AccountName for painting, then the property values input for the properties that are supported by the attribute will be transferred to the corresponding properties within the attribute—AccountName. For example, if the user input the name "My Bank Account" for the Name property and the Name property is supported by the attribute—AccountName, then the Name property of the attribute—AccountName will take on the value "My Bank Account". Thus, only those attributes selected and supporting the property will receive the property value. When in full shot mode, if the user selects the attribute—AccountName for painting within the entity Bank Account, then the property values input for the properties that are supported by the attribute will be transferred to the corresponding properties within the attributes—AccountName and AccountNumber. For example, if the user input the name "My Bank Account" for the Name property and the Name property is supported by the attributes—AccountName and AccountNumber, then the Name property of the attributes—AccountName and AccountNumber will take on the value "My Bank Account". Thus, all attributes within the entity and supporting the property will receive the property value.

FIG. 3F shows that once the property values are transferred or painted to an attribute, the tool may provide an indication 355 of the transfer or paint, for example, a change to the identifier such as a change to the text color from red to green or font from bold to underline. FIG. 3G shows the indication 355 of the transfer or paint may also be viewed within the source code using a source code viewer or editor. As should be understood, this is just one use case where the property painter tool can be used. The property painter tool may also be used in many scenarios where repeated field entries are needed. For example, in any UI client, as in a web browser where repeated form entry is needed such as a 'Quantity' field for numerous inventory items. If 100 inventory items are present and the same quantity, for example, 20, needs to be applied to thirty of the inventory items, a user can paint the required quantity on those thirty fields very easily using the techniques described herein.

Figure 4:
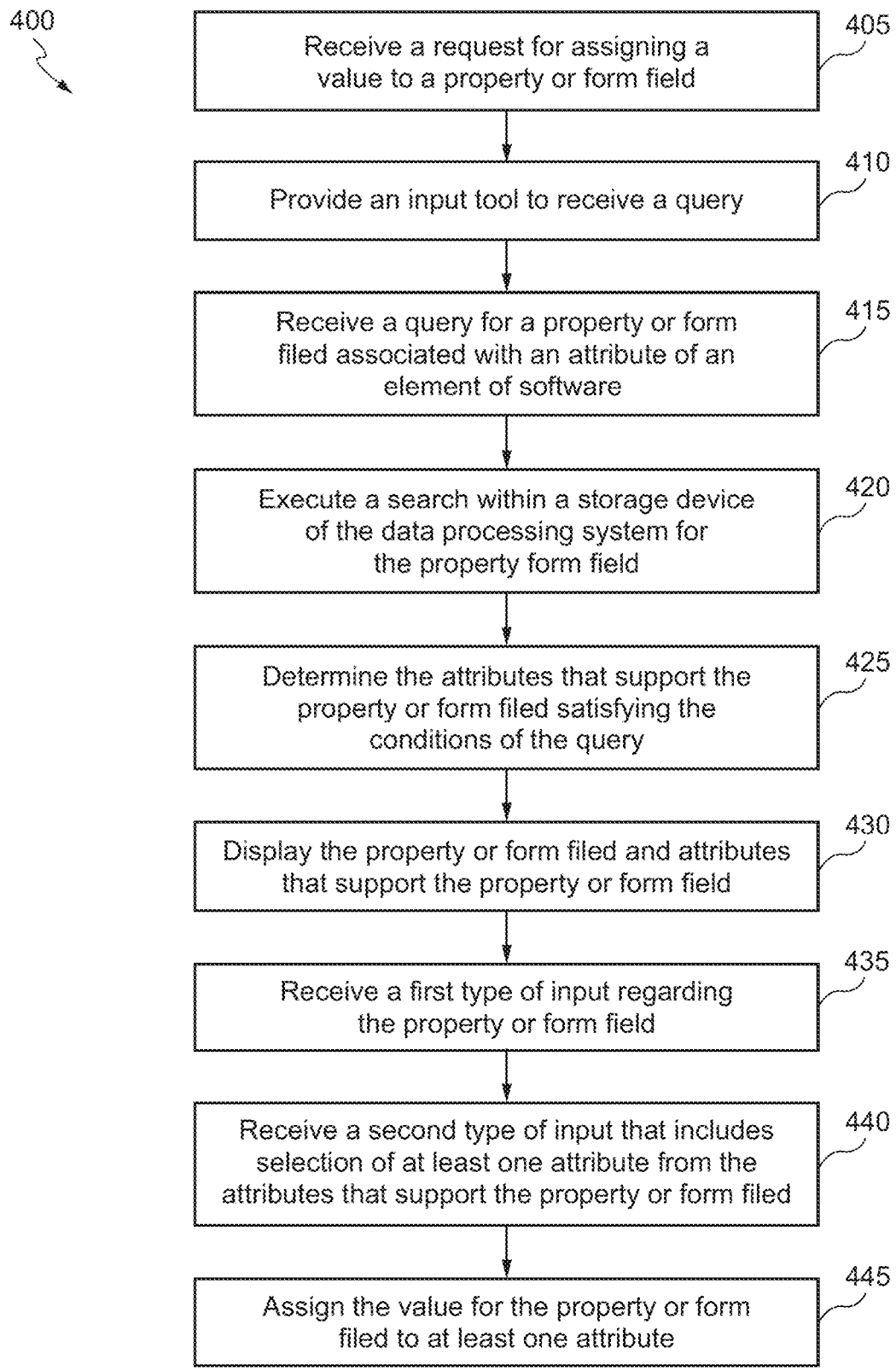
FIG. 4 depicts a flowchart illustrating a process for assigning one or more values to properties or form fields in accordance with various embodiments.

FIG. 4 illustrates processes and operations for assigning one or more values to properties or form fields. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, in alternative embodiments the steps outlined above may be performed in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates a process for assigning one or more values to properties or form fields. In some embodiments, the processes depicted in flowchart 400 may be implemented by the architecture, systems, and techniques depicted in FIGS. 1 and 2. At step 405, a request for assigning a value to a property is received at a data processing system. The data processing system may be an IDE, as described with respect to FIGS. 1 and 2. In some embodiments, a user clicks on a tool icon such as the painter tool 315 described with respect to FIG. 3B, which triggers a request to be sent to the IDE for assigning a property value to a property. At step 410, in response to the request, an input tool may be provided to receive a query. In some embodiments, the input tool is a query bar as shown in FIG. 3C. At step 415, a query is received for a property associated with an attribute of an element of software (e.g., an application being developed in an ADF). In some embodiments, a user may input one or more properties (e.g., a property that the user is interested in assigning a value) into the input tool and initiate a request of the IDE to perform a query for the one or more properties. In instances in which the query comprises multiple properties, a user may link the properties with one or more operators. For example, in the instance of a Boolean type query, a user may link the properties with an "OR" operator, an "AND" operator, or a combination thereof. If an "OR" operator is used, then the user is looking for partial support between the properties, and the query will return the properties that satisfy the query and the attributes that support at least one of the properties linked with the "OR" operator. If an "AND" operator is used, then the user is looking for full support between properties, and the query will return the properties that satisfy the query and the attributes that support all of the properties linked with the "AND" operator.

At step 420, a search is executed within a storage device of the data processing system for the property or multiple properties that satisfy the query. As should be understood, in alternative embodiments involving the use of form fields, the search could be executed within a storage device for the form field or multiple form fields that satisfy the query. The search includes parsing through the properties stored in the storage device, and identifying all properties that match conditions of the query. In some instances, the conditions of the query include the entire name of the property. In other instances, the conditions of the query include only a portion of the entire name of the property. Thus, a property or multiple properties may satisfy the query based on a whole or partial match. As used herein, when an action is "based on" something, this means the action is based at least in part on at least a part of the something. In various embodiments, the conditions of the query further include whether the search should be run across properties for all attributes of the software or tailored to one or more specific attributes of the software. In some instances, the conditions are implied by the interface in which the input tool is requested and subsequently invoked. For example, as shown in FIG. 3A, if the user selects the input tool in an interface that is displaying a particular element—BankAccount, then the conditions for the search may be implied to limit the search to only properties associated with element—BankAccount or the specific attributes associated with element—BankAccount. In other instances, the conditions are expressly provided by the user. For example, if the user wants to search for properties across all elements of the software, then the query may include an open ended operator to designate that all properties for the software should be included in the search.

At step 425, the attributes that support the property or multiple properties satisfying the conditions of the query are determined. The determination of support may be made for the attributes defined by the conditions of the query. The conditions of the query used to determine the support may include: (i) the properties and operators, and (ii) the attributes involved in the search, e.g., all attributes of the software or tailored to one or more specific attributes of the software). For example, if two properties are queried with a "AND" operator and the search is limited to only the attributes associated with a viewed element, then the support determination will be made based on which attributes associated with a viewed element support both the first and second property (full support). Alternatively, if two properties are queried with a "OR" operator and the search is limited to only the attributes associated with a viewed element, then the support determination will be made based on which attributes associated with a viewed element support either the first property, the second property, or both properties (partial support). The determination may be made by parsing metadata or specifications associated with the attributes defined by the conditions of the query, and identifying all attributes (e.g., a subset of the total group of attributes defined by the conditions of the query) that match conditions of the query and are associated with metadata or specifications that include the properties. The metadata or specifications of the attributes is data that summarizes basic information about the attributes. In certain embodiments, the basic information includes a list of properties that are supported by the attribute.

At step 430, the property or multiple properties and attributes that support the property or multiple properties are displayed. For instance, see FIGS. 3D and 3E, where the property or multiple properties satisfying the conditions of the query are displayed in a virtual box 330 that is layered over the interface of the user (only a portion of the interface is shown from FIG. 3A), which displays the attributes 350 that support the property or multiple properties satisfying the conditions of the query. In various embodiments, the attributes that support the property or multiple properties are displayed in a manner such that the attributes that support the property or multiple properties are distinguishable from attributes that do not support the property or multiple properties. For example, the interface or display of the user may already include attributes that are the basis for the query. As shown in FIG. 3A, if the user selects the attributes tab in an interface that is displaying a particular element—BankAccount, then all properties associated with the element—BankAccount are displayed in the interface. Further, as shown in FIGS. 3D and 3E, the property or multiple properties and attributes that support the property or multiple properties are displayed (attributes—AccountName and AccountNumber shown in bold text) along with the property or multiple properties and attributes that do not support the property or multiple properties (attributes—BankAccountId and BankName shown in normal text). Accordingly, the attributes are displayed with an identifier (e.g., a text font change from normal to bold) to identify whether the attributes support at least one of the properties, all of the properties, or none of the properties. As should be understood, other identifiers could be used rather than a text font change.

At step 435, a first type of input is received regarding the property. The first type of input includes value for the property. As shown in FIG. 3C, the user may input a value 335 into the virtual box 330 comprising the property or multiple properties satisfying the conditions of the query. The value may be provided by the user (e.g., entry of a numerical or text value) or selected from a set of possible values (e.g., true/false). In some embodiments, the first type of input further includes selection of a first painting mode or second painting mode. At step 440, a second type of input is received that includes selection of at least one attribute from the attributes that support the property or multiple properties. In a first (partial) painting mode 340 with partial support, (e.g., partial painting may be enabled with selection and partial support may be enabled with a Boolean search operation such as "OR" between the queried properties), attributes that support at least one or more of the queued properties are identified. Each of the attributes that support at least one or more of the queried properties may be individually selected for painting of one or more corresponding property values. The selection can be made at the entity level or attribute level and the painting operation may be implemented within or across entities and attributes. Thus, during a property value paint operation in partial painting mode 340 with partial support, only the queried properties that are supported by the attribute get set with the input values, and the user can paint property values on any attribute that supports at least one of the queried properties. In a first (partial) painting mode 340 with full support, (e.g., partial painting may be enabled with selection and full support may be enabled with a Boolean search operation such as "AND" between the queried properties) only the attributes that support all of the queued properties are identified. Each of the attributes that support all of the queried properties may be individually selected for painting of one or more corresponding property values. The selection can be made at the entity level or attribute level and the painting operation may be implemented within or across entities and attributes. Thus, during a property value paint operation in partial painting mode 340 with full support, all the queried properties that are supported by the attribute get set with the input values, and the user can only paint property values on the attributes supporting all of the queried properties. In some embodiments, there can be distinct colored indications provided for each property queued and the supported properties can be displayed beside attributes that support the specific property for easy identification.

In a second (single) shot mode 345 with partial support, (e.g., single shot may be enabled with selection and partial support may be enabled with a Boolean search operation such as "OR" between the queried properties), attributes that support at least one or more of the queued properties are identified. All of the attributes that support at least one or more of the queried properties are may be selected with a single selection (grouped selection method) for painting of one or more corresponding property values. The selection may be made at the entity level and the painting operation may be implemented within or across entities and attributes. Thus, during a property value paint operation in single shot mode 345 with partial support, only the queried properties that are supported by the attribute get set with the input values, and the user can paint property values on any attribute that supports at least one of the queried properties. In a second (single) shot mode 345 with full support, (e.g., single shot may be enabled with selection and full support may be enabled with a Boolean search operation such as "AND" between the queried properties) only the attributes that support all of the queued properties are identified. All of the attributes that support all of the queried properties may be selected with a single selection (grouped selection method) for painting of one or more corresponding property values. The selection may be made at the entity level and the painting operation may be implemented within or across entities and attributes. Thus, during a property value paint operation in single shot mode 345 with full support, all the queried properties that are supported by the attribute get set with the input values, and the user can only paint property values on the attributes supporting all of the queried properties. In some embodiments, there can be distinct colored indications provided for each property queued and the supported properties can be displayed beside attributes that support the specific property for easy identification.

At step 445, the value for the property or multiple properties is assigned to at least one attribute. FIG. 3E shows a user may click on any supported attribute on which they want property values to be painted. When in partial painting mode, if the user selects the attribute—AccountName for painting, then the property values input for the properties that are supported by the attribute will be transferred to the corresponding properties within the attribute—AccountName. When in full shot mode, if the user selects the attribute—AccountName for painting within the entity Bank Account, then the property values input for the properties that are supported by the attribute will be transferred to the corresponding properties within the attributes—AccountName and AccountNumber. Moreover, once the property values are transferred or painted to an attribute, an indication may be provided of the transfer or paint, for example, a change to the identifier such as a change to the text color from red to green or font from bold to underline may be displayed.

Illustrative Systems

Figure 5:
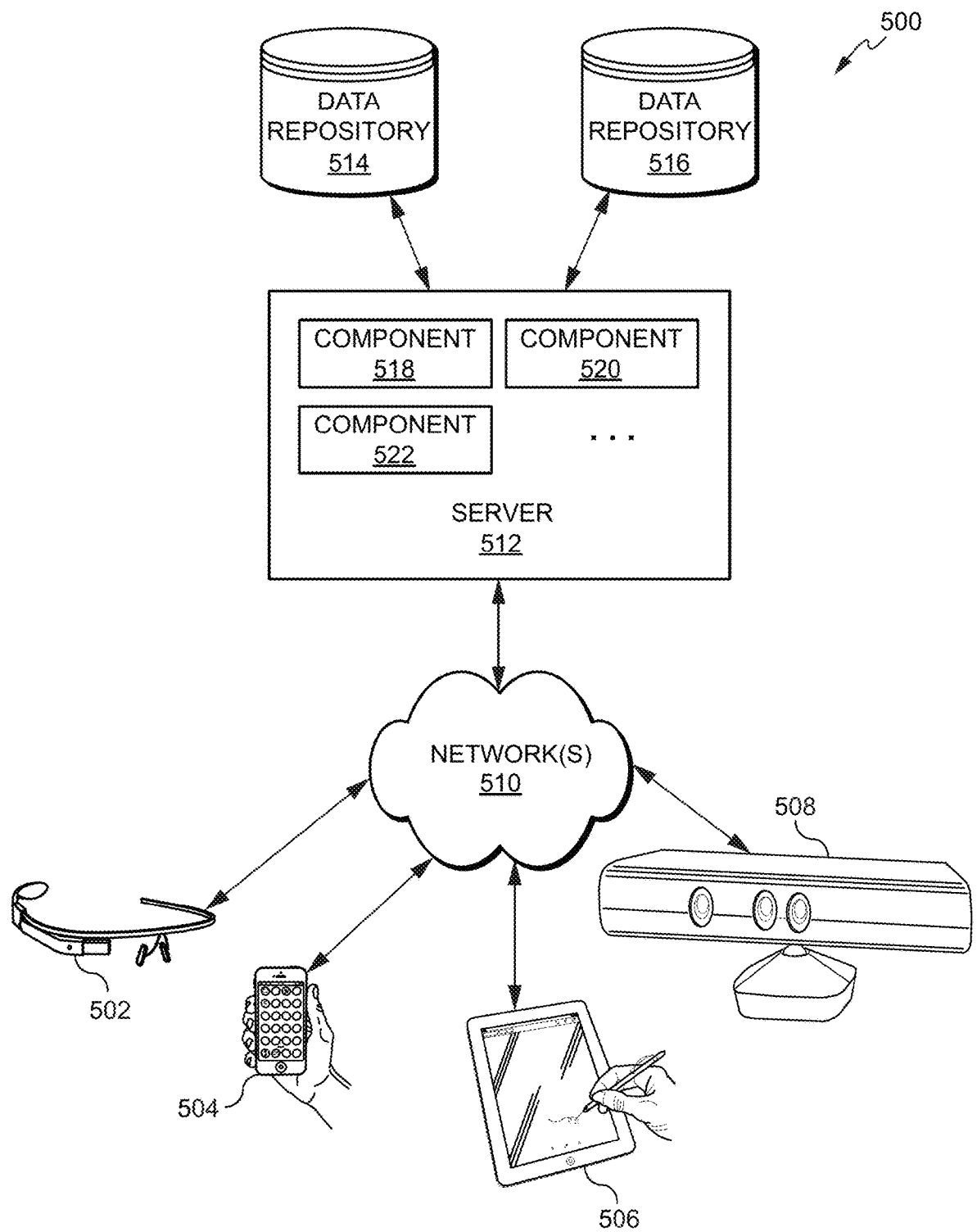
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable a user to assign one or more values to properties or form fields.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to assign one or more values to properties or form fields. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for assigning one or more values to properties or form fields. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
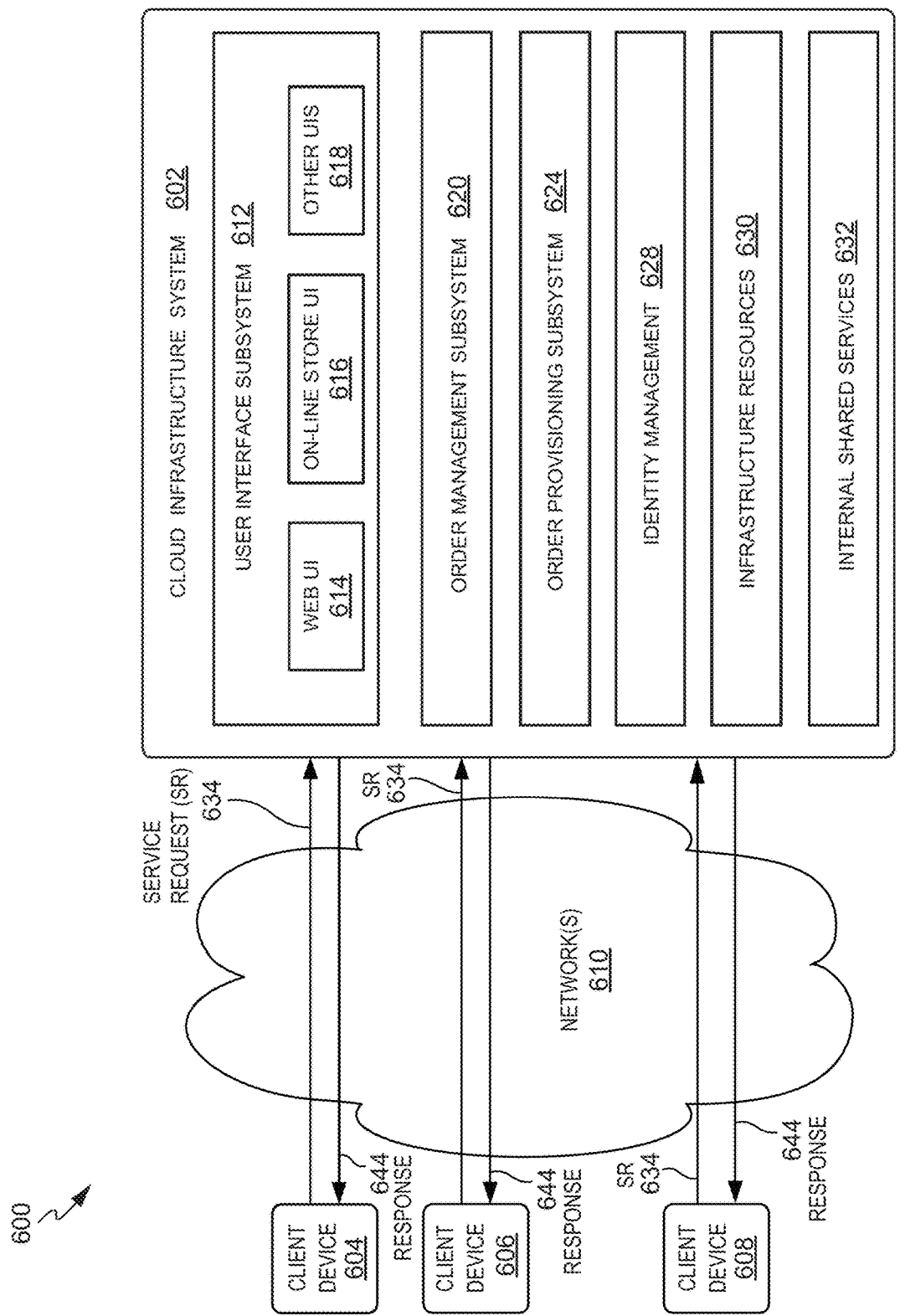
FIG. 6 depicts a simplified block diagram of one or more components of a system environment by which services provided by one or more components of an embodiment system may be offered as cloud services, in accordance with various embodiments.

In certain embodiments, the assigning of one or more values to properties or form fields described in this disclosure may be offered as services via a cloud environment. FIG. 6 is a simplified block diagram of a cloud-based system environment in which the assigning of one or more values to properties or form fields may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, assigning of one or more values to properties or form fields. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to the assign one or more values to properties or form fields.

In some embodiments, the processing performed by cloud infrastructure system 602 for the assigning of one or more values to properties or form fields may involve big data analysis. This analysis may involve using, analyzing, and manipulating large datasets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for assigning of one or more values to properties or form fields. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a property painting related service offered by cloud infrastructure system 602. As part of the order, the customer may provide information identifying one or more values to be assigned to properties or form fields.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer assigning one or more values to properties or form fields, the response may include a display of the attributes supporting the properties or form fields that have been assigned the one or more values.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
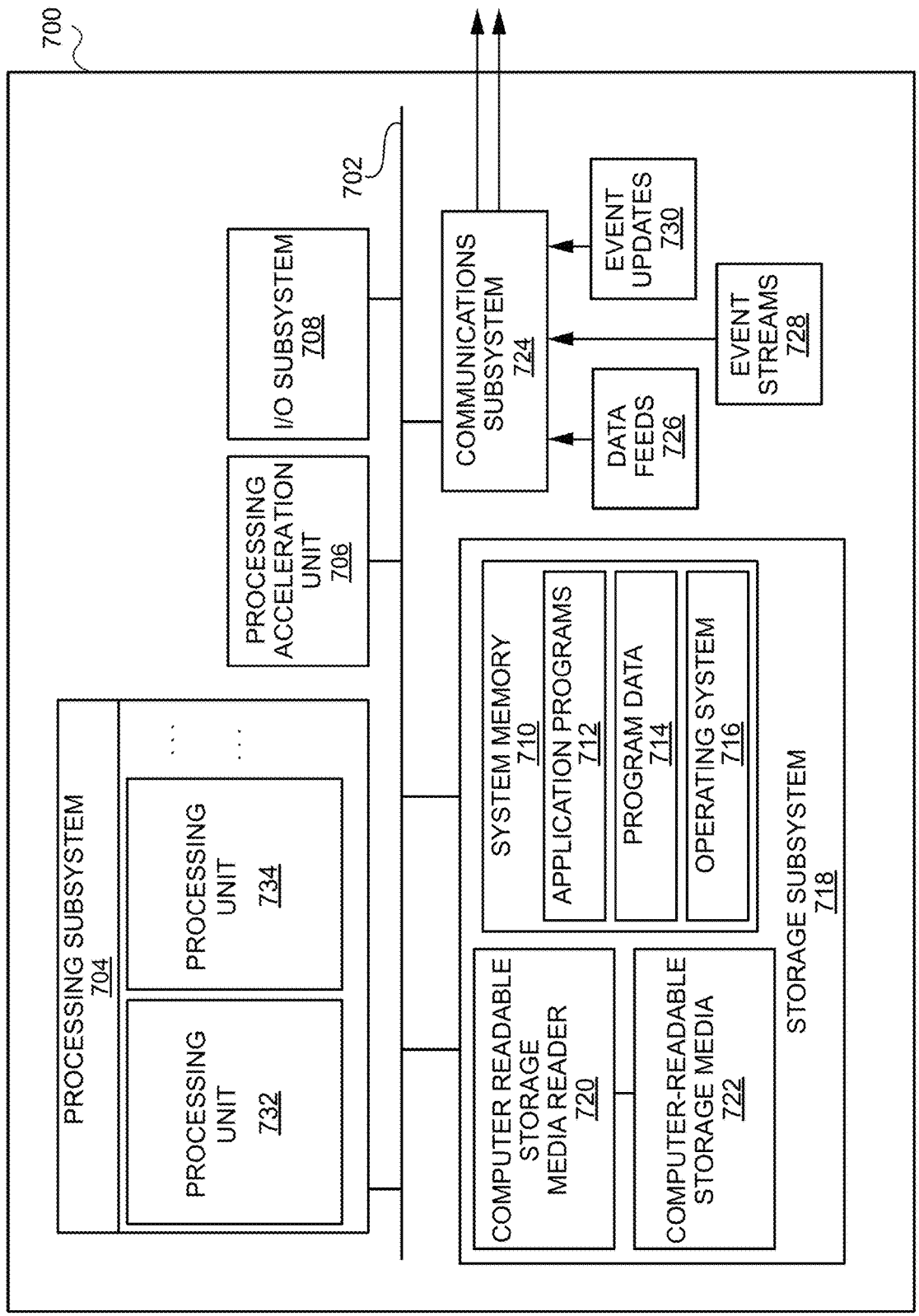
FIG. 7 depicts an example computer system that may be used to implement various embodiments.

FIG. 7 illustrates an exemplary computer system 700 that may be used to implement certain embodiments. For example, in some embodiments, computer system 700 may be used to implement any of the property painting techniques and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain property values for painting.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by an integrated development environment (IDE), a query for a property associated with an attribute of an element of an application being developed by the IDE, wherein the IDE is a code editor implemented in a Model-View-Controller (MVC) design pattern, wherein the element is a sequence of abstract program statements of the application that describe computations to be performed by a machine, and wherein the property is a variable, setting, configuration, or rule attributable to the element;
executing, by the IDE, a search within a storage device of the IDE data processing system for the property that satisfies the query;
displaying, by the IDE, the property and attributes that support the property;

receiving, by the IDE, a first type of input regarding the property, wherein the first type of input includes a value for the property;

receiving, by the IDE, a second type of input that includes selection of at least one attribute from the attributes that support the property, wherein the selection is made at the element level or the attribute level; and assigning, by the IDE, the value for the property to the at least one attribute within or across elements or attributes of the application.

2. The method of claim 1, wherein the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

3. The method of claim 2, wherein the attributes are displayed with the identifier to identify whether the attributes support all of the properties.

4. The method of claim 1, wherein the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

5. The method of claim 4, wherein the value is assigned to only the selected multiple attributes across multiple elements of the software.

6. The method of claim 1, wherein the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

7. The method of claim 6, wherein the value is assigned to all of the attributes identified to support the property across multiple elements of the software.

8. A non-transitory computer-readable memory storing a plurality of instructions executable by one or more processors of an integrated development environment (IDE), the plurality of instructions comprising instructions that when executed by the one or more processors cause the one or more processors to perform processing comprising:

receiving a query for a property associated with an attribute of an element of an application being developed by the IDE, wherein the IDE is a code editor implemented in a Model-View-Controller (MVC) design pattern, wherein the element is a sequence of abstract program statements of the application that describe computations to be performed by a machine, and wherein the property is a variable, setting, configuration, or rule attributable to the element;

executing a search within a storage device of the IDE for the property that satisfies the query;

displaying the property and attributes that support the property;

receiving a first type of input regarding the property, wherein the first type of input includes a value for the property, wherein the selection is made at the element level or the attribute level;

receiving a second type of input that includes selection of at least one attribute from the attributes that support the property; and assigning the value for the property to the at least one attribute within or across elements or attributes of the application.

9. The non-transitory computer-readable memory of claim 8, wherein the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

10. The non-transitory computer-readable memory of claim 9, wherein the attributes are displayed with the identifier to identify whether the attributes support all of the properties.

11. The non-transitory computer-readable memory of claim 8, wherein the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

12. The non-transitory computer-readable memory of claim 11, wherein the value is assigned to only the selected multiple attributes across multiple elements of the software.

13. The non-transitory computer-readable memory of claim 8, wherein the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

14. The non-transitory computer-readable memory of claim 13, wherein the value is assigned to all of the attributes identified to support the property across multiple elements of the software.

15. A system comprising:
one or more processors of an integrated development environment (IDE); and
a memory coupled to the one or more processors, the memory storing a plurality of instructions executable by the one or more processors, the plurality of instructions comprising instructions that when executed by the one or more processors cause the one or more processors to perform processing comprising:

receiving a query for a property associated with an attribute of an element of an application being developed by the IDE, wherein the IDE is a code editor implemented in a Model-View-Controller (MVC) design pattern, wherein the element is a sequence of abstract program statements of the application that describe computations to be performed by a machine, and wherein the property is a variable, setting, configuration, or rule attributable to the element;

executing a search within a storage device of the IDE for the property that satisfies the query;

displaying the property and attributes that support the property;

receiving a first type of input regarding the property, wherein the first type of input includes a value for the property;

receiving a second type of input that includes selection of at least one attribute from the attributes that support the property, wherein the selection is made at the element level or the attribute level; and assigning the value for the property to the at least one attribute within or across elements or attributes of the application.

16. The system of claim 15, wherein the query includes a plurality of properties linked with one or more operators, the search retrieves all properties that satisfy the query, the displaying includes displaying the properties that satisfy the query, and the attributes are displayed with an identifier to identify whether the attributes support at least one of the properties.

17. The system of claim 16, wherein the attributes are displayed with the identifier to identify whether the attributes support all of the properties.

18. The system of claim 15, wherein the first type of input further includes selection of a first painting mode, the second type of input includes selection of a multiple attributes from the attributes identified to support the property, the multiple attributes are a subset of the attributes identified to support the property, and the value is assigned to only the selected multiple attributes based on the selection of the first painting mode.

19. The system of claim 18, wherein the value is assigned to only the selected multiple attributes across multiple elements of the software.

20. The system of claim 15, wherein the first type of input further includes selection of a second painting mode, the second type of input includes selection of a single attribute from the attributes identified to support the property or selection of the element having the attributes identified to support the property, and the value is assigned to all of the attributes identified to support the property based on the selection of the second painting mode.

* * * * *

UNITED STATES PATENT AND TRADEMARK OFFICE
CERTIFICATE OF CORRECTION

PATENT NO. : 11,132,374 B2
APPLICATION NO. : 16/528378
DATED : September 28, 2021
INVENTOR(S) : Asokan Page 1 of 1

It is certified that error appears in the above-identified patent and that said Letters Patent is hereby corrected as shown below:

On the Title Page

On page 2, Column 1, under Item (56) Other Publications, Line 12, delete ".cadopla." and insert -- .cadopia. --, therefor.

In the Claims

In Column 28, Line 64, in Claim 1, before "for the property" delete "data processing system".

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*